United States Patent
Birgen et al.

(10) Patent No.: US 10,787,117 B2
(45) Date of Patent: Sep. 29, 2020

(54) APPARATUS AND METHOD FOR EVENLY ILLUMINATING A ROTATING ELEMENT WITH SINGLE OR MINIMAL LIGHT SOURCE(S)

(71) Applicant: Prometheus Wheels L.L.C., Tempe, AZ (US)

(72) Inventors: William Birgen, Tempe, AZ (US); Hakim Hill, Tempe, AZ (US)

(73) Assignee: PROMETHEUS WHEELS L.L.C., Tempe, AZ (US)

( * ) Notice: Subject to any disclaimer, the term of this patent is extended or adjusted under 35 U.S.C. 154(b) by 141 days.

(21) Appl. No.: 15/842,199

(22) Filed: Dec. 14, 2017

(65) Prior Publication Data

US 2018/0111545 A1 Apr. 26, 2018

Related U.S. Application Data

(63) Continuation of application No. 14/715,896, filed on May 19, 2015, now Pat. No. 9,845,044.

(60) Provisional application No. 62/000,994, filed on May 20, 2014.

(51) Int. Cl.
| | |
|---|---|
| *F21S 10/00* | (2006.01) |
| *B60Q 1/32* | (2006.01) |
| *F21V 33/00* | (2006.01) |
| *B62J 6/00* | (2020.01) |
| *F21S 10/06* | (2006.01) |
| *A63C 17/26* | (2006.01) |
| *F21Y 115/10* | (2016.01) |
| *F21Y 113/17* | (2016.01) |

(52) U.S. Cl.
CPC .......... *B60Q 1/326* (2013.01); *F21V 33/0096* (2013.01); *A63C 17/26* (2013.01); *A63C 2203/14* (2013.01); *B62J 6/00* (2013.01); *F21S 10/005* (2013.01); *F21S 10/063* (2013.01); *F21Y 2113/17* (2016.08); *F21Y 2115/10* (2016.08)

(58) Field of Classification Search
CPC . B60Q 1/326; F21V 33/0096; A63C 2203/14; A63C 17/26; B62J 6/20; B62J 2006/006; B62J 6/00; F21Y 2113/17; F21Y 2101/02; F21S 10/005; F21S 10/063; F21S 10/06
See application file for complete search history.

(56) References Cited

U.S. PATENT DOCUMENTS

| | | | | |
|---|---|---|---|---|
| 5,800,035 | A | * | 9/1998 | Aichele ................ G02B 6/0006 362/500 |
| 6,220,733 | B1 | * | 4/2001 | Gordon .................. B60Q 1/326 362/500 |
| 2003/0169594 | A1 | * | 9/2003 | Khan ..................... B60Q 1/326 362/500 |

(Continued)

*Primary Examiner* — Y M. Quach Lee
(74) *Attorney, Agent, or Firm* — Venjuris, P.C.

(57) ABSTRACT

An apparatus for illuminating a rotating element of the apparatus with as few as a single light source and a method for assembling such apparatus are disclosed herein. The apparatus comprises a center, a clear substrate element that may rotate about the center, and a light source for evenly illuminating the clear substrate element. The light source is configured to emit light toward the clear substrate element at an angle, which is predetermined based on one or more attributes of the clear substrate element, such as the geometry and the index of refraction.

15 Claims, 7 Drawing Sheets

(56) References Cited

U.S. PATENT DOCUMENTS

| | | | | |
|---|---|---|---|---|
| 2006/0279962 A1* | 12/2006 | Loh | ............. | G02F 1/133603 |
| | | | | 362/561 |
| 2008/0124085 A1* | 5/2008 | Yoshikawa | ............ | G08C 23/04 |
| | | | | 398/106 |
| 2009/0141514 A1* | 6/2009 | Palkovic | ................ | B60Q 1/326 |
| | | | | 362/509 |
| 2014/0268839 A1* | 9/2014 | Timmerberg | ....... | F21V 33/0008 |
| | | | | 362/473 |

* cited by examiner

APPARATUS AND METHOD FOR EVENLY ILLUMINATING A ROTATING ELEMENT WITH SINGLE OR MINIMAL LIGHT SOURCE(S)

CROSS-REFERENCE TO RELATED APPLICATIONS

The present application is a continuation of the U.S. patent application entitled "Apparatus and Method for Evenly Illuminating a Rotating Element With Single or Minimal Light Source(s)," having Ser. No. 14/715,896, filed on May 19, 2015, which claims priority to a U.S. provisional patent application entitled "Apparatus and Method for Evenly Illuminating a Rotating Element With a Single Light Source," having Ser. No. 62/000,994, filed on May 20, 2014, both entirely incorporated herein by reference.

BACKGROUND

Illumination on a rotating device such as a vehicle's wheel has been a trend at least as early as the release of a science fiction film: "Tron: Legacy,"® in 2010. Not only are illuminated wheels trendy and eye-catching but they also add visibility to the vehicle. Illuminated wheels make driving safer for the driver of the vehicle as well as for pedestrians and other drivers on the road, especially under foggy or dark conditions.

Although most existing products adopt LED (Light Emitting Diode) light bulbs, which consume relatively low energy compared to their traditional counterparts, multiple light bulbs are used within the rotating device in order to light up the entire wheel. As many of these products use batteries, using multiple light bulbs means more frequent battery changes or recharges, which are both inconvenient and uneconomical. Besides, the fewer the light bulbs are needed for illuminating a wheel, the lower the costs for buying and maintaining the devices are. Therefore, methods and apparatuses for reducing the number of light sources while sufficiently illuminating the rotating wheels reduce costs for acquiring and maintaining such illuminating devices and are needed in the market. Additionally, mounting the battery with the lights, within the rotating hardware may adversely affect the balance of the rotating hardware.

SUMMARY

The structure, overall operation and technical characteristics of the present invention will become apparent with the detailed description of preferred embodiments and the illustration of the related drawings as follows.

The invention is incorporated in an apparatus for illuminating a rotating element of the apparatus with as few as a single light source and a method for assembling such apparatus. The apparatus comprises a center, a clear substrate element that may rotate about the center, and a light source for evenly illuminating the clear substrate element. An example of the apparatus is an automobile wheel having a rim which is substantially or partially made of clear plastic (the clear substrate element) and illuminated by an LED (the light source) when the rim rotates about the wheel hub (the center). Another example of the apparatus includes a wheel of a bicycle with clear plastic rims, which are illuminated in the same way as the above-mentioned automobile wheel.

In addition to implementing this invention on vehicles, this invention may also be applied to a windmill with clear airfoils, a ceiling fan with clear blades, and so forth, and have other potential benefits. Like a wheel, a windmill with an illuminated airfoil not only has additional fashion and entertainment components as a personal statement of style, but it also is more visible to airplanes, thus being safer. Furthermore, evenly illuminating the blades of a ceiling fan may replace separate light fixtures in a room.

As to the benefits of adopting a clear substrate element, just like optical fiber cables, light may transmit and scatter in any object made of a substantially clear substrate. Essentially all of any contiguous clear object may become a light bulb which illuminates wholly from a light source, such as a small LED, introducing light in any part of the clear substrate element. A person skilled in the art would know various methods, existing at the time of this invention, for introducing light into a clear rotating object.

The clear substrate element may be made of clear plastic, fiberglass, light transmissive resin sheets as in U.S. Pat. No. 8,668,353 by Nicholas S. Bromer, or any suitable materials known in the art. The clear substrate element may also be made of a combination of various materials such as laminate of various plies with different materials as long as light can travel inside the entire clear substrate element. Under the same condition, it may be clear, somewhat opaque, or colored.

Additionally, as long as the light can enter the clear substrate element, the clear substrate element may include various means to create more even or brighter illumination, including reflective cladding applied partially to the exterior of the clear substrate element on the side opposite to the intended view point, particulates suspended inside clear substrate element to refract light locally, and so on. Furthermore, because the geometry of the clear substrate element affects whether the light may scatter in the entire clear substrate element by not being refracted too much near the point of entry of the light, the geometry needs to be properly designed. In brief, as long as the clear substrate element can be illuminated evenly, just like an optical fiber cable, the clear substrate element may be made of any suitable material, with any color, opacity, and geometry.

The light source may be affixed to a relatively stationary part of the apparatus and configured to emit light toward the clear substrate element at a predetermined angle. Take the aforementioned automobile wheel as an example: the LED may be affixed to the wheel hub, the brake caliper, via an independent stationary bracket, and so forth. The light source may be any proper device that emits light, such as an LED, a light that emits multiple colors interchangeably (such as an RGB, Red-Green-Blue, light), or a laser source.

In addition, a person skilled in the art would know that various ways exist at the time of this invention for providing electric power to the light source. An example of a power supply module for the light source is a battery, preferably rechargeable. Another example may be a small electric generator such as a magnet adjacent to an electromagnetic toroidal coil coupled to the light source to induce power when there is a relative movement between the magnet and the coil. Yet another example may be an external power module configured to introduce electrical power from an external source (such as a battery of a vehicle, an electrical outlet on a wall/ceiling, and so forth). For an embodiment having a light source suspended within the clear substrate and an external power module, the external power source may be connected to the light source via a wiper contact between the power source and a rotating conductive element connected to the light source with the rotating substrate.

The angle between the light source and the clear substrate element ($Angle_1$) is determined by the preferred angle between the incoming direction of the light and the normal angle of the first surface inside the clear substrate element that reflects the light (Angle$_2$, the angle of incidence). Angle$_2$ is preferably greater than or equal to the critical angle of the surface for total internal reflection to occur, and the critical angle is determined by the index of refraction, which is dependent on the materials of the clear substrate element. For example, when the clear substrate element is made of clear acrylic, the index of refraction is about 1.5 while the critical angle is about 41.8°, and Angle$_2$ is thus preferably greater than 42°.

The preferred material selection for a load bearing rotating substrate is polycarbonate. It is readily available yet economically accessible. The index of refraction of polycarbonate is 1.6, and the critical angle is 38.7°. More desirable yet is anti-static polycarbonate. A static dissipative (ESD) substrate would be resistant to dust which could otherwise obscure the light as it is introduced into the rotating substrate. Non-load bearing substrates may utilize a more economical material which offers favorable optic qualities, such as acrylic, lucite, or plexiglass.

Fiber content may be added to the resin/substrate to increase strength. This augmenting of the structural properties of the "pure" resin solution allows for thinner designs without sacrificing needed strength. Preferred orientation of the fiber content within the substrate should be radial and circumferential. While it depends on the application and the load vectors imparted on the rotating apparatus, in general, the radial fiber orientation will increase structural integrity, while the circumferential fiber orientation may assist with light propagation from the source where the light is introduced to the far (opposite) side (180° circumferentially from introduced source).

In addition, the geometry of the clear substrate element affects how many times the light with a specific angle of incidence (Angle$_2$) may be reflected in the clear substrate element. Therefore, in order to evenly illuminate the clear substrate element by minimum refraction, the preferred angle of incidence (Angle$_2$) is affected by various attributes of the clear substrate element, including its geometry and index of refraction. Because Angle$_1$ is determined by Angle$_2$, which is affected by the attributes of the clear substrate element, Angle$_1$ can be said to be determined by these attributes. For example, when the light receiving area of the clear substrate element is parallel to the first surface the light is reflected within the clear substrate element, by Snell's law, the relationship of Angle$_1$ and Angle$_2$ is:

$$\frac{\sin(Angle_1)}{\sin(Angle_2)} = \frac{n_2}{n_1},$$

wherein $n_1$ and $n_2$ are the indices of refraction of the air and the clear substrate element respectively.

Moreover, the light source may be configured to emit more than one color of light based on different settings. For example, in an embodiment which is an automobile wheel, the light may be blue when the vehicle is moving, red when the brakes are applied, and flash/blink orange when a turn signal on the same side of the wheel is turned on. Alternatively, the apparatus may in addition comprise a velocimeter or may receive the speed reading from the vehicle and change the light color according to the speed. In addition, a user of the apparatus may define the settings of the light or change its color by a control means.

Some embodiments may further include a stationary brush, squeegee, or felt wiper in constant or periodic contact with the substrate annulus at which light is introduced. The purpose of this brush, squeegee, or wiper is to constantly or periodically clean the annulus of dirt to maximize the light entering into the substrate. In lieu of a wipe or brush, a boot may be used to guard or otherwise protect the substrate annulus from dirt/dust or some other contaminant.

One object of this invention is to evenly illuminate a rotating element of an apparatus by a single light source.

Another object is to reduce the cost and energy consumption for illuminating a rotating object.

BRIEF DESCRIPTION OF THE DRAWINGS OR PICTURES

DESCRIPTION OF THE EMBODIMENTS

Figure 1A:
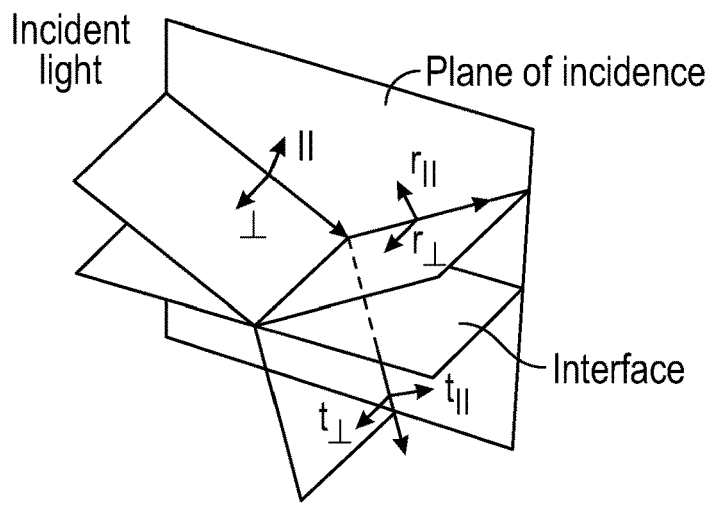
FIG. 1A shows the reflection and transmission of electromagnetic waves at an interface.
Figure 1B:
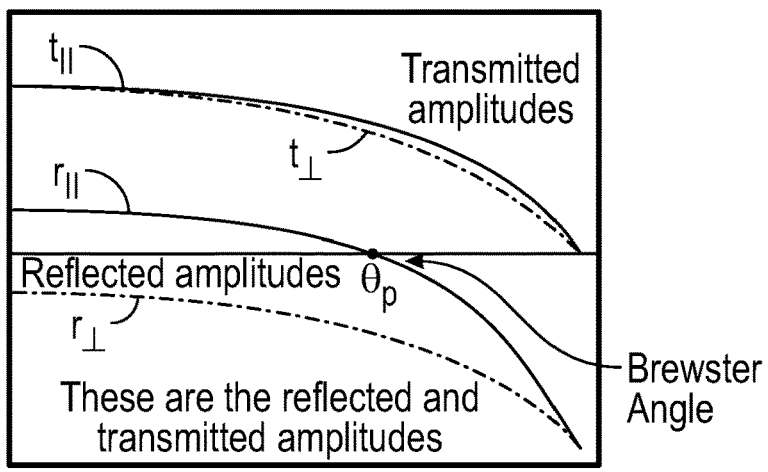
FIG. 1B shows the incident angles and the corresponding light reflected and transmitted.
Figure 1C:
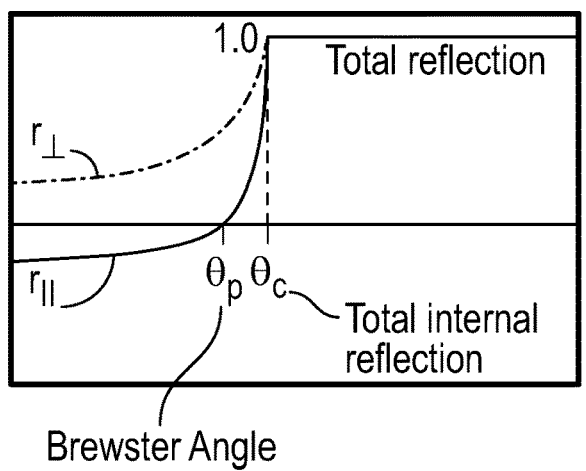
FIG. 1C shows typical reflection curves for internal reflection.
Figure 2A:
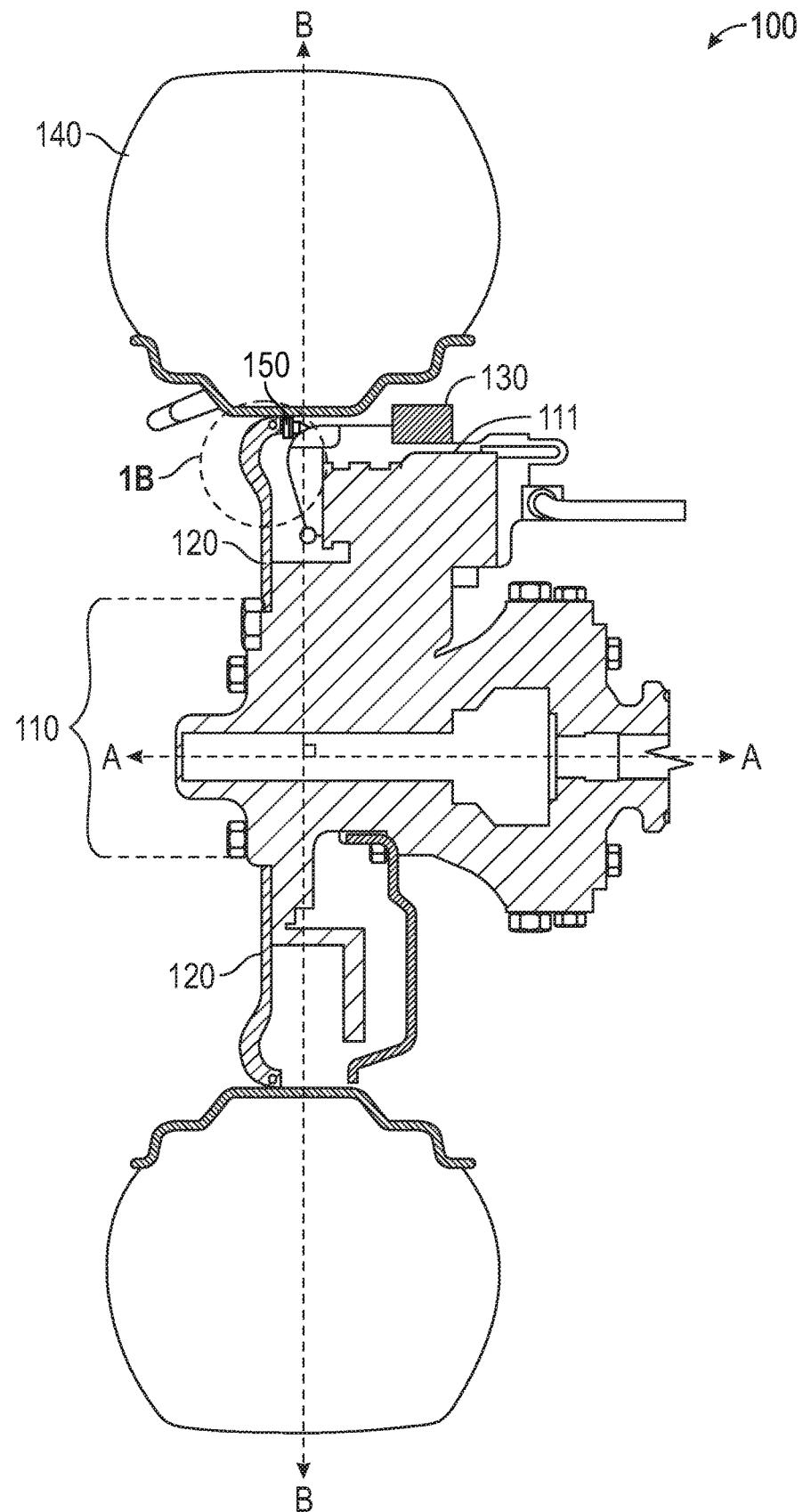
FIG. 2A shows a cross sectional view of an embodiment.
Figure 2B:
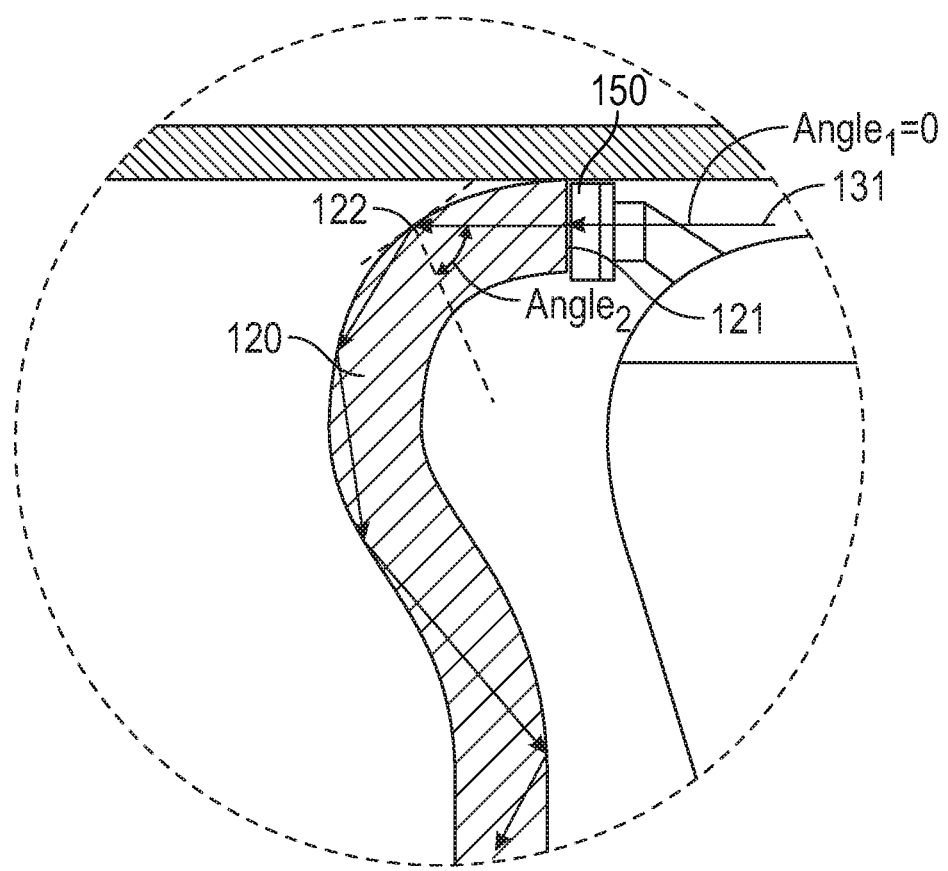
FIG. 2B shows a partial enlarged view of the embodiment in FIG. 2A.
Figure 3A:
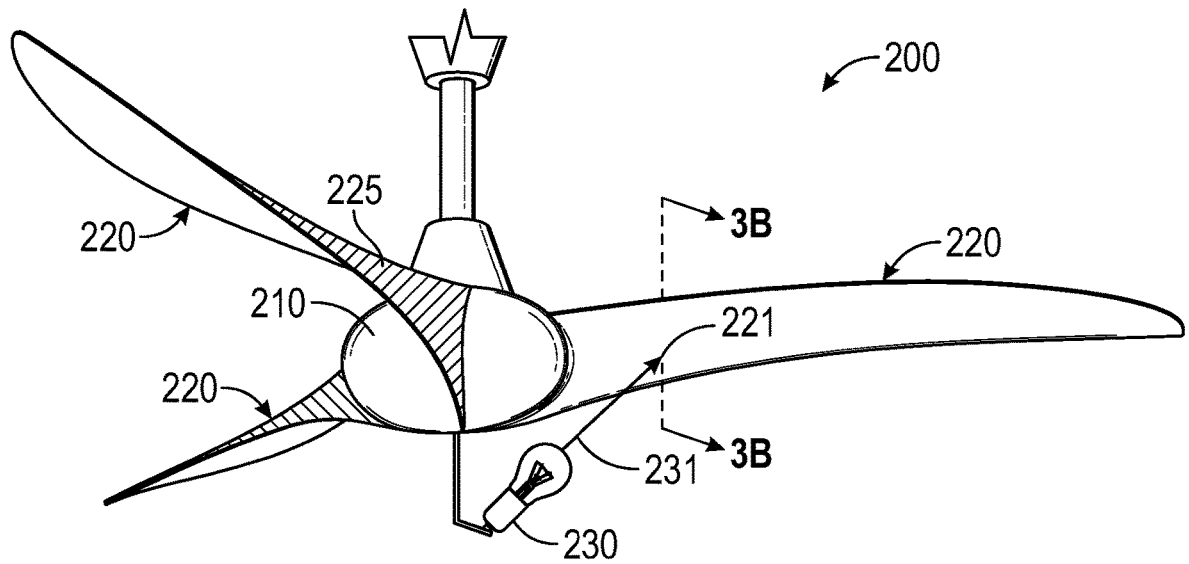
FIG. 3A shows an alternate embodiment.
Figure 3B:
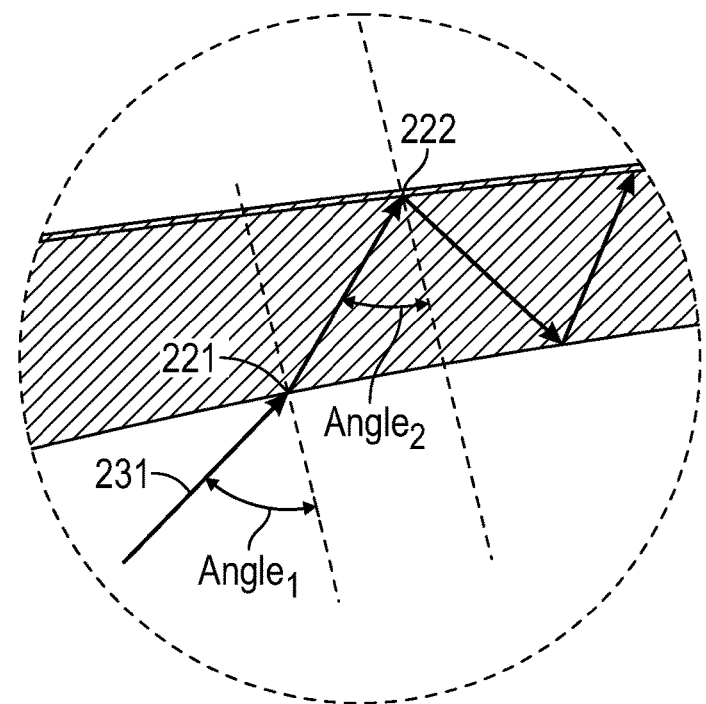
FIG. 3B shows a partial, cross sectional view of a clear substrate element of the embodiment in FIG. 3A.

The reflection and transmission of light are illustrated in FIGS. 1A-1C, while the preferred embodiments include automobile wheels in FIGS. 2A-2B, FIGS. 4A-4B, and FIGS. 5A-5C and a ceiling fan shown in FIGS. 3A-3B.

Typical reflection and transmission curves for external reflection are shown in FIGS. 1A-1C. Note that the reflected amplitude in FIG. 1B for the light polarized parallel to the incident plane is zero for a specific incident angle called the Brewster angle ($\theta_p$). The reflected light is then linearly polarized in the plane perpendicular to the incident plane. This polarization by reflection is exactly the opposite of what this invention requires to be effective.

Total internal reflection is what is ideal for this invention to be most effective. If perfect total internal reflection is not achievable the invention may still be effectively illuminated, though the invention will be illuminated less efficiently. It will require more light to be introduced to compensate for light which is lost from the rotating substrate through refraction.

FIG. 1C shows typical reflection curves for internal reflection. Internal reflection implies that the reflection is from an interface to a medium of lesser index of refraction, as in our case, from polycarbonate, or acrylic (or some comparable substrate) to air. Another characteristic of internal reflection is that there is always an angle of incidence $\theta_c$ (the critical angle) above which all light is reflected back into the medium. This phenomenon of total internal reflection is the ideal for this invention.

In the automobile wheel embodiment in FIGS. 2A & 2B, the wheel 100 has a center (the wheel hub 110), a clear substrate element (the clear plastic spokes of the rim 120) that can rotate about the center 110, a tire 140 coupled to the rim 120, and a single light source (RBG light/laser source 130) coupled to the center 110 (by being affixed to the disc brake caliper 111 that is coupled to the center 110), relatively stationary to the center 110. The light source 130 in this embodiment 100 is coupled to the battery or the electrical system of the automobile by an external power module (not shown) that comprises power wires and connectors.

In this embodiment, the light 131 emitted from the light source 130 toward a light receiving area 121 of the clear substrate element 120 (perpendicularly, i.e. $Angle_1=0$ here) is angled relative to the normal of the surface (122) opposite to where the light comes from ($Angle_2$, the first incident angle of the light 131 inside the clear substrate element 120, as in the enlarged view of FIG. 2B). The path of the light 131 travelling, ideally totally reflected, inside the clear substrate element 120 is shown in FIG. 2B. As previously stated, the preferred incident angle $Angle_2$ is predetermined based on a group of attributes of the clear substrate element 120, such as the geometry and the index of refraction. The preferred incident angle $Angle_2$ is properly chosen or adjusted so that ideally, total internal reflection of the light 131 occurs continuously inside the clear substrate element 120, and the light 131 may illuminate the entire clear substrate element 120. In an exemplary embodiment whose clear substrate element is made of clear acrylic, the index of refraction is about 1.5 while the critical angle is about 41.8°. The first angle of incidence $Angle_2$ is thus preferably greater than 42° so that the light is totally reflected when it first hits the surface inside the clear substrate element. In another embodiment whose clear substrate is made of clear polycarbonate whose index of refraction is 1.6, and the critical angle is 38.7°, the first angle of incident $Angle_2$ is preferably greater than 40°.

Moreover, when the geometry of the clear substrate element 120 is properly designed, total internal reflection can occur continuously in order to prevent the light 131 from exiting the rotating substrate 120. As shown in FIGS. 2A & 2B, the clear substrate element 120 in this embodiment 100 is elongated while curved so most of the incoming light 131 from one end is reflected internally to reach the other end. As aforementioned, when the index of refraction is correctly combined with the ideal geometry total internal reflection will occur within the rotating substrate. Total internal reflection within the rotating substrate occurs when all incident angles are greater than the critical angle. When this occurs there is no refracted (light) ray, only a reflected ray. Details of how to predict the reflection and transmission of light moving between different media are well known in the art (as shown in FIGS. 1A-1C, including the law of reflection, Snell's law, and the Fresnel's equations).

In addition, because the light source 130 (a RGB light) may emit various colors of light (red, green, blue, and various combinations), the light 131 may be configured to synchronize with the lighting system of the automobile and further used as a signal light such as an additional turn signal or a brake lamp. Although not shown in the figures, the clear substrate element 120 (spokes) may have reflective cladding on the exterior sides, other than that facing outward (the left side of the spokes in FIGS. 2A-2B) and the entry point of light 131, in order to capture the refracted light and make the spokes 120 brighter and illuminated more even.

Figure 4A:
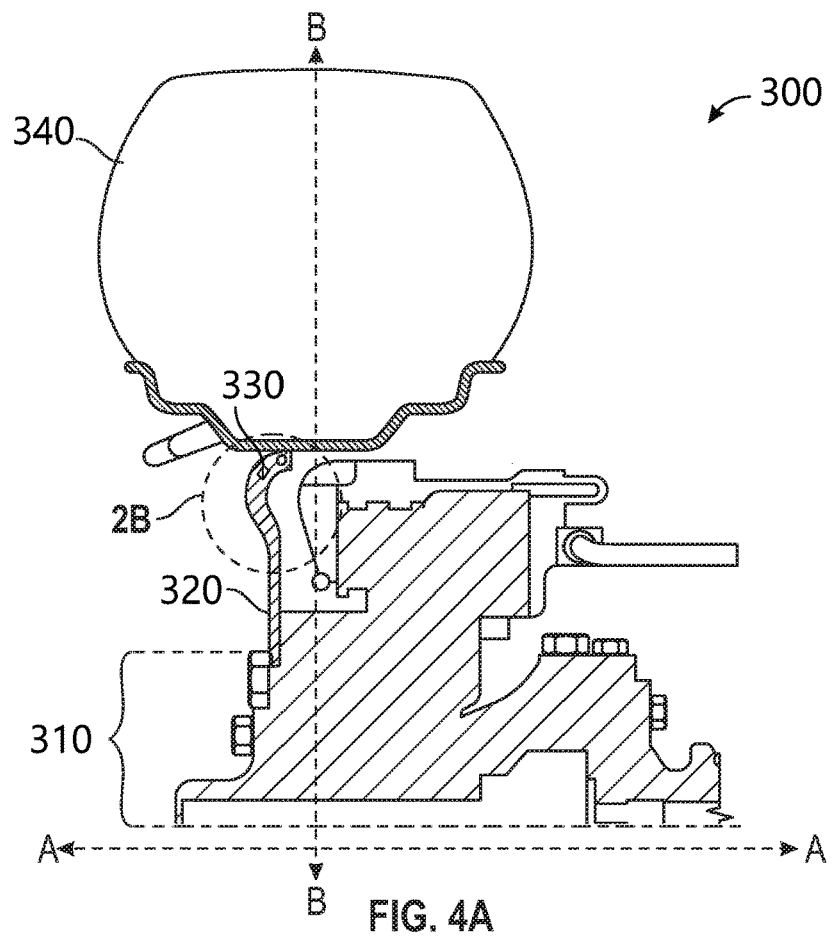
FIG. 4A shows a cross sectional view of another embodiment.
Figure 4B:
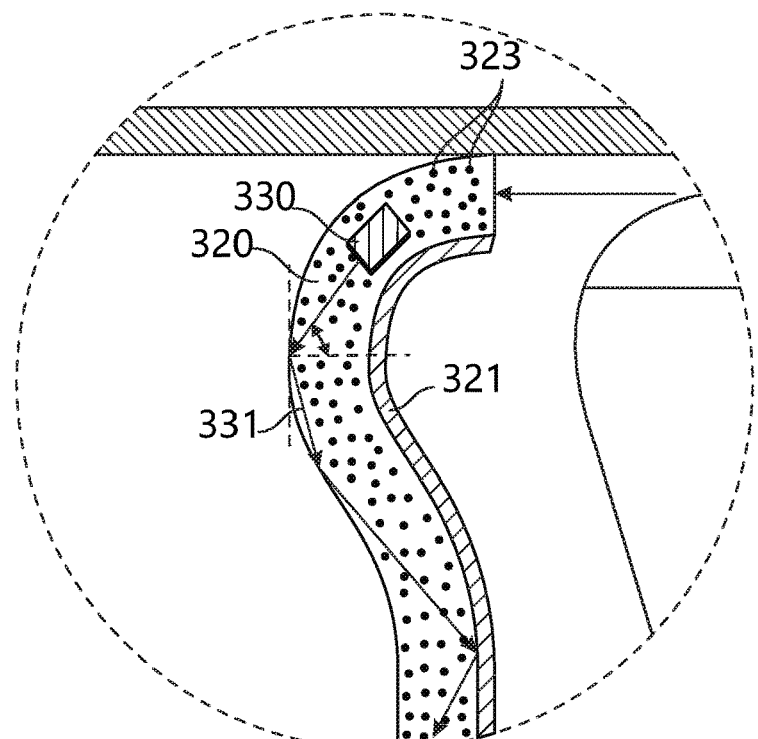
FIG. 4B shows a partial enlarged view of the embodiment in FIG. 4A.
Figure 5A:
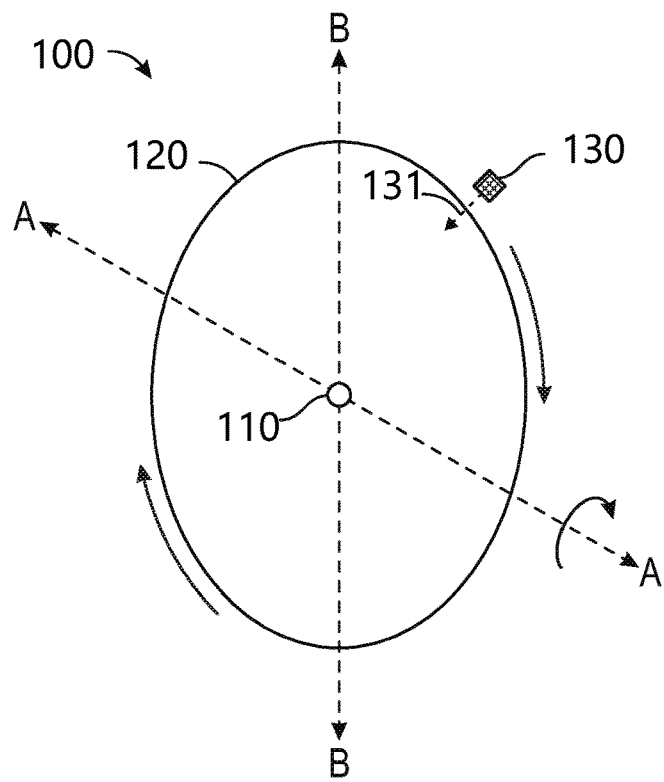
FIG. 5A illustrates the embodiment implemented on a vehicle's wheel wheel as shown in FIGS. 2A-2B when the vehicle is moving forward or backward.
Figure 5B:
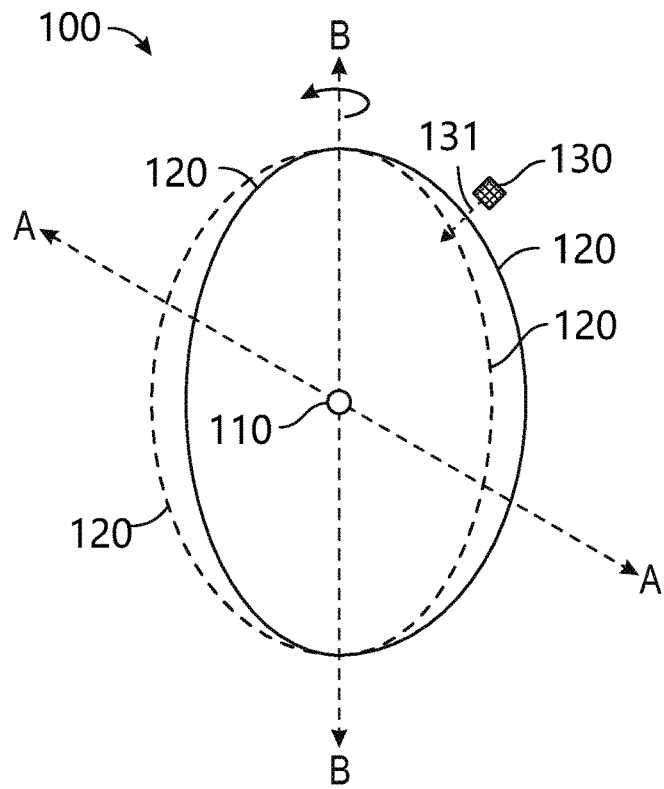
FIG. 5B illustrates the embodiment in FIG. 5A when the vehicle is steered left or right.
Figure 5C:
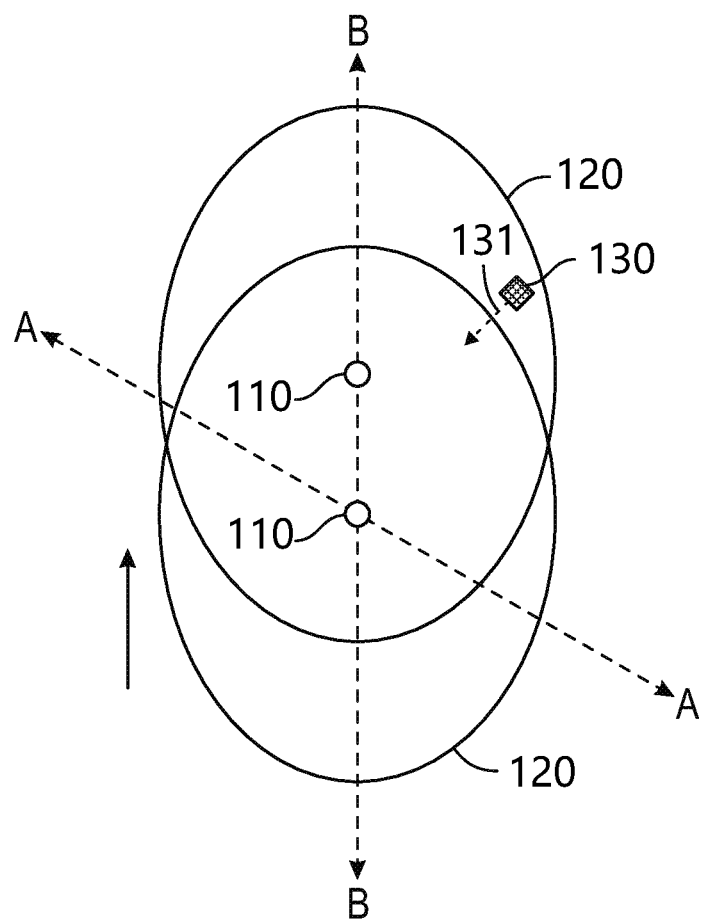
FIG. 5C shows the embodiment in FIG. 5A when the vehicle's suspension causes the wheel to move vertically.

In another automobile wheel embodiment 300 with a center 310, a clear substrate (rim) 320, and a tire 340, illustrated in FIGS. 4A-4B, a light source 330 is suspended within the clear substrate 320 and glitter 323 is suspended evenly in the materials of the clear substrate element 220 to make it brighter. Like the light source 130 in FIGS. 2A-2B, the light source 330 is configured to emit a light 331 that ideally travels inside the clear substrate 320, totally reflected. In addition, in an alternate embodiment, the flange of the rim that secures the tire may also be a part of the clear substrate element, and thus the whole rim may be illuminated. Yet another embodiment serving to maximize the rotating substrates illumination would include a 2 way mirror film/coating/treatment on the exterior of the illuminated substrate, just as the reflective cladding 321 on the exterior of the clear substrate 320 in the embodiment 300 in FIGS. 4A-4B. When not illuminated the clear rotating substrate would appear with a reflective mirror or chrome like surface finish.

FIGS. 3A & 3B show another preferred embodiment, a ceiling fan 200 with elongated blades 220 made substantially of a clear material, such as fiberglass and plastic. A light source 230, such as an LED, may be mounted to a center 210 (the flywheel) and emitting light 231 toward a proximal end of a blade 220, either from the top or the bottom (from the bottom in this embodiment). With a proper geometry of the blades 220 and a suitable angle between the light 231 emitted from the light source 230 and the blades 220, each blade 220 may be evenly illuminated when it rotates near the light source 230. As such, the ceiling fan 200 may replace a separate light fixture. Additionally, to improve illumination, reflective cladding may be applied to the ceiling-facing (top) sides 225 of the blades 220 so that the blades would look brighter. Alternatively, reflective cladding applied to the downward (bottom) sides of the blades would prevent glare and create a more uniform lighting environment.

In this embodiment, the light 231 emitted from the light source 230 toward a light receiving area 221 of the clear substrate element 220 (at $Angle_1$) is angled relative to the normal of the surface (222) opposite to where the light comes from ($Angle_2$, the first incident angle of the light 231 inside the clear substrate element 220, as in FIG. 3B). The path of the light 231 travelling, ideally totally reflected, inside the clear substrate element 220 is shown in FIG. 3B. Again, the preferred incident angle $Angle_2$ is predetermined based on a group of attributes of the clear substrate element 220, such as the geometry and the index of refraction.

As stated above, load bearing rotating substrates may be made of polycarbonate, or preferably anti-static polycarbonate which is resistant to dust that could otherwise obscure the light as it is introduced into the rotating substrates. On the other hand, non-load bearing substrates may utilize a more economical material which offers favorable optic qualities, such as acrylic, lucite, or plexiglass. Fiber content may be added to the resin/substrate to increase strength. This augmenting of the structural properties of the "pure" resin solution allows for thinner designs without sacrificing needed strength. Preferred orientation of the fiber content within the substrate should be radial and circumferential. While it depends on the application and the load vectors imparted on the rotating apparatus, in general, the radial fiber orientation will increase structural integrity, while the circumferential fiber orientation may assist with light propagation from the source where the light is introduced to the far (opposite) side (180° circumferentially from introduced source).

Yet another embodiment may additionally include a stationary brush, squeegee, or felt wiper in constant or periodic contact with the substrate annulus at which light is introduced in order to constantly or periodically clean the annulus of dirt to maximize the light entering into the substrate. As shown in FIGS. 2A-2B, the embodiment 100 includes a stationary dust wiping element 150 located close to the entry point of light 131 and configured to periodically contact and clean the entry point. Alternatively, a boot may be used to guard or otherwise protect the substrate annulus from dirt/dust or some other contaminant.

While the invention has been described by means of specific embodiments, numerous modifications and variations could be made thereto by those ordinarily skilled in the art without departing from the score and spirit disclosed herein.

The invention claimed is:

1. An apparatus for emitting light from a wheel hub, comprising:
   (a) the wheel hub having a center, the center configured to rotate about a horizontal axis and pivot about a vertical axis, the horizontal axis and vertical axis crossing each other at the center;
   (b) a clear substrate element having a critical angle $\theta_c$, the clear substrate element being fixedly coupled to the wheel hub; and
   (c) a light source fixedly coupled distal from, and non rotatable relative to, the horizontal axis, the light source being configured to emit a light toward the clear substrate element at an angle and move along the vertical axis relative to the clear substrate and the center, wherein
   the angle is predetermined based on attributes of the clear substrate element, the attributes being selected from a group consisting of a geometry, an index of refraction, and a combination thereof, so that at least a first incident angle of the light after entering the clear substrate element is at least as great as the critical angle $\theta_c$.

2. The apparatus in claim 1, wherein the light source is further configured to emit the light toward a rim of the clear substrate, the rim being distal from the center.

3. The apparatus in claim 1, wherein when the apparatus is coupled to a vehicle with a lighting system, the light source is further configured to synchronize with the lighting system of the vehicle and change a color of the light accordingly.

4. The apparatus in claim 1, wherein the light source is further configured to change a color of the light according to a speed of the apparatus.

5. The apparatus in claim 1, wherein the clear substrate element further comprises a reflective cladding applied to a side of the clear substrate element.

6. The apparatus in claim 1, wherein the clear substrate element further comprises a plurality of light reflective particles suspended inside the clear substrate element.

7. The apparatus in claim 1 further comprises a power supply module coupled to the light source, the power supply module being selected from a group consisting of a battery, an electric generator, an external power module, and combinations thereof.

8. The apparatus in claim 1 further comprises a dust wiping element coupled to the center and configured to wipe a light receiving area of the clear substrate element.

9. A method for evenly illuminating a wheel hub on a vehicle comprising the steps of:
   (a) providing the wheel hub comprising a center and a clear substrate element, the clear substrate element having a critical angle $\theta_c$ and being coupled to the center and configured to rotate about a horizontal axis and pivot about a vertical axis, the horizontal axis and vertical axis crossing each other at the center;
   (b) fixedly coupling a light source distally from, and non-rotating relative to, the horizontal axis, the light source being-configured to move along the vertical axis relative to the center and the clear substrate; and
   (c) configuring the light source to emit a light toward the clear substrate element at an angle, the angle being predetermined based attributes of the clear substrate element, the attributes being selected from a group consisting of a geometry, an index of refraction, and a combination thereof, so that at least a first incident angle of the light after entering the clear substrate element is at least as great as the critical angle $\theta_c$.

10. The method in claim 9 further comprises a step of configuring the light source to emit the light toward a rim of the clear substrate, the rim being distal from the center.

11. The method in claim 9 further comprises a step of configuring the light source to synchronize with a lighting system of a vehicle that the object is coupled to and change a color of the light emitted from the light source accordingly.

12. The method in claim 9 further comprises a step of configuring the light source to change a color of the light according to a speed of the object.

13. The method in claim 9 further comprises a step of coupling a dust wiping element to the center, the dust wiping element being configured to wipe a light receiving area of the clear substrate element.

14. The apparatus in claim 1 wherein,
   a brake caliper is coupled to the horizontal axis and the light source is coupled to the brake caliper.

15. The method in claim 9 wherein,
   a brake caliper is coupled to the horizontal axis and the light source is coupled to the brake caliper.

* * * * *